United States Patent
Horowitz et al.

(10) Patent No.: US 10,031,931 B2
(45) Date of Patent: *Jul. 24, 2018

(54) SYSTEMS AND METHODS FOR AUTOMATING MANAGEMENT OF DISTRIBUTED DATABASES

(71) Applicant: MongoDB, Inc., New York, NY (US)

(72) Inventors: Eliot Horowitz, New York, NY (US); Cailin Anne Nelson, Boulder, CO (US); Louisa Berger, Brooklyn, NY (US)

(73) Assignee: MongoDB, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/654,601

(22) Filed: Jul. 19, 2017

(65) Prior Publication Data

US 2017/0322954 A1    Nov. 9, 2017

Related U.S. Application Data

(63) Continuation of application No. 14/969,537, filed on Dec. 15, 2015.

(51) Int. Cl.
  *H04L 9/08*     (2006.01)
  *G06F 17/30*    (2006.01)

(52) U.S. Cl.
  CPC .. *G06F 17/30292* (2013.01); *G06F 17/30321* (2013.01); *G06F 17/30581* (2013.01); *H04L 9/0891* (2013.01)

(58) Field of Classification Search
  CPC ............. H04L 9/0891; G06F 17/30321; G06F 17/30581; G06F 17/30292
  See application file for complete search history.

(56) References Cited

U.S. PATENT DOCUMENTS 5,471,629 A * 11/1995 Risch ................ G06F 17/30368
                                                     707/687
5,551,027 A    8/1996  Choy et al.
(Continued)

OTHER PUBLICATIONS

[No Author Listed], Automated Administration Tasks (SQL Server Agent). https://docs.microsoft.com/en-us/sql/ssms/agent/automated-adminsitration-tasks-sql-server-agent. 2 pages. [downloaded Mar. 4, 2017].

(Continued)

*Primary Examiner* — Yonas Bayou
(74) *Attorney, Agent, or Firm* — Wolf, Greenfield & Sacks, P.C.

(57) ABSTRACT

An automation system is provided to automate any administrative task in a distributed database, such that the end user can input a goal state (e.g., create database with a five node architecture) and the automation system generates and executes a plan to achieve the goal state without further user input. According to another aspect, bringing existing database systems into automated management can be as complex as designing the database itself. According to some embodiments, the automation system is configured to analyze existing database systems, capture and/or install monitoring components within the existing database, and generate execution pathways to integrate existing database systems into automation control systems. Based on the current state information, the automation system is configured to generate an installation pathway of one or more intermediate states to transition the existing system from no automation to a goal state having active automation agents distributed throughout the database.

20 Claims, 10 Drawing Sheets

(56) References Cited

U.S. PATENT DOCUMENTS

| | | | |
|---|---|---|---|
| 5,710,915 A | 1/1998 | McElhiney | |
| 5,999,179 A | 12/1999 | Kekic et al. | |
| 6,324,540 B1 | 11/2001 | Khanna et al. | |
| 6,324,654 B1 | 11/2001 | Wahl et al. | |
| 6,351,742 B1* | 2/2002 | Agarwal | G06F 17/30463 |
| 6,363,389 B1 | 3/2002 | Lyle et al. | |
| 6,505,187 B1 | 1/2003 | Shatdal | |
| 6,687,846 B1 | 2/2004 | Adrangi et al. | |
| 6,823,474 B2 | 11/2004 | Kampe et al. | |
| 7,032,089 B1 | 4/2006 | Ranade et al. | |
| 7,177,866 B2 | 2/2007 | Holenstein et al. | |
| 7,191,299 B1 | 3/2007 | Kekre et al. | |
| 7,246,345 B1 | 7/2007 | Sharma et al. | |
| 7,548,928 B1 | 6/2009 | Dean et al. | |
| 7,567,991 B2 | 7/2009 | Armangau et al. | |
| 7,617,369 B1 | 11/2009 | Bezbaruah et al. | |
| 7,634,459 B1* | 12/2009 | Eshet | G06F 17/30306 |
| 7,647,329 B1* | 1/2010 | Fischman | G06F 17/30094 707/999.1 |
| 7,962,458 B2 | 6/2011 | Holenstein et al. | |
| 8,126,848 B2 | 2/2012 | Wagner | |
| 8,363,961 B1 | 1/2013 | Avidan et al. | |
| 8,386,463 B2 | 2/2013 | Bestgen et al. | |
| 8,392,482 B1 | 3/2013 | McAlister et al. | |
| 8,572,031 B2 | 10/2013 | Merriman et al. | |
| 8,615,507 B2* | 12/2013 | Varadarajulu | G06F 17/30433 707/718 |
| 8,843,441 B1 | 9/2014 | Rath et al. | |
| 9,317,576 B2 | 4/2016 | Merriman et al. | |
| 9,740,762 B2 | 8/2017 | Horowitz et al. | |
| 9,805,108 B2 | 10/2017 | Merriman et al. | |
| 2003/0088659 A1 | 5/2003 | Susarla | H04L 29/06 709/223 |
| 2004/0168084 A1* | 8/2004 | Owen | G06F 17/30566 726/26 |
| 2004/0205048 A1* | 10/2004 | Pizzo | G06F 17/30368 |
| 2004/0236743 A1 | 11/2004 | Blaicher et al. | |
| 2005/0038833 A1* | 2/2005 | Colrain | G06F 9/5027 |
| 2005/0192921 A1* | 9/2005 | Chaudhuri | G06F 17/30368 |
| 2006/0168154 A1* | 7/2006 | Zhang | G06F 11/1662 709/220 |
| 2006/0235905 A1 | 10/2006 | Kapur | |
| 2007/0094237 A1* | 4/2007 | Mitchell | G06F 17/30581 |
| 2008/0140971 A1 | 6/2008 | Dankel et al. | |
| 2008/0288646 A1 | 11/2008 | Hasha et al. | |
| 2009/0222474 A1 | 9/2009 | Alpern et al. | |
| 2009/0240744 A1 | 9/2009 | Thomson et al. | |
| 2009/0271412 A1 | 10/2009 | Lacapra et al. | |
| 2010/0030793 A1 | 2/2010 | Cooper et al. | |
| 2010/0030800 A1 | 2/2010 | Brodfuehrer et al. | |
| 2010/0106934 A1 | 4/2010 | Calder et al. | |
| 2010/0198791 A1 | 8/2010 | Wu et al. | |
| 2011/0202792 A1 | 8/2011 | Atzmony | |
| 2011/0225122 A1 | 9/2011 | Denuit et al. | |
| 2011/0231447 A1 | 9/2011 | Starkey | |
| 2012/0078848 A1 | 3/2012 | Jennas et al. | |
| 2012/0084414 A1 | 4/2012 | Brock et al. | |
| 2012/0109892 A1 | 5/2012 | Novik et al. | |
| 2012/0166390 A1 | 6/2012 | Merriman et al. | |
| 2012/0254175 A1 | 10/2012 | Horowitz | |
| 2013/0290249 A1 | 10/2013 | Merriman et al. | |
| 2014/0164831 A1 | 6/2014 | Merriman et al. | |
| 2016/0203202 A1 | 7/2016 | Merriman et al. | |
| 2017/0032007 A1 | 2/2017 | Merriman | |
| 2017/0032010 A1 | 2/2017 | Merriman | |
| 2017/0169059 A1 | 6/2017 | Horowitz et al. | |
| 2017/0262519 A1 | 9/2017 | Horowitz et al. | |
| 2017/0270176 A1 | 9/2017 | Horowitz et al. | |
| 2017/0286516 A1 | 10/2017 | Horowitz et al. | |
| 2017/0286517 A1 | 10/2017 | Horowitz et al. | |
| 2017/0286518 A1 | 10/2017 | Horowitz et al. | |
| 2017/0322996 A1 | 11/2017 | Horowitz et al. | |
| 2017/0344290 A1 | 11/2017 | Horowitz et al. | |
| 2017/0344441 A1 | 11/2017 | Horowitz et al. | |
| 2017/0344618 A1 | 11/2017 | Horowitz et al. | |

OTHER PUBLICATIONS

Chang et al., Bigtable: a distributed storage system for structured data. OSDI'06: Seventh Symposium on Operating System Design and Implementation. Nov. 2006.

Cooper et al., PNUTS: Yahoo!'s hosted data serving platform. VLDB Endowment. Aug. 2008.

Decandia et al., Dynamo: Amazon's highly available key-value store. SOSP 2007. Oct. 2004.

Nelson et al., Automate MongoDB with MMS. PowerPoint Presentation. Published Jul. 24, 2014. 27 slides. http://www.slideshare.net/mongodb/mms-automation-mongo-db-world.

Stirman, Run MongoDB with Confidence using MMS. PowerPoint Presentation. Published Oct. 6, 2014. 34 slides. http://www.slideshare.net/mongodb/mongo-db-boston-run-mongodb-with-mms-20141001.

Van Renesse et al., Chain replication for supporting high throughput and availability. OSDI. 2004: 91-104.

Wilkins et al., Migrate DB2 applications to a partitioned database. developerWorks, IBM. Apr. 24, 2008, 33 pages.

\* cited by examiner

SYSTEMS AND METHODS FOR AUTOMATING MANAGEMENT OF DISTRIBUTED DATABASES

RELATED APPLICATIONS

This application claims the benefit under 35 U.S.C. § 120 of U.S. application Ser. No. 14/969,537, entitled "SYSTEMS AND METHODS FOR AUTOMATING MANAGEMENT OF DISTRIBUTED DATABASES" filed on Dec. 15, 2015, which is herein incorporated by reference in its entirety.

BACKGROUND

A number of conventional database systems exist that implement large and scalable database architectures. A variety of database architectures can be selected and tailored to a specific data requirement (e.g., large volume reads, high data availability, no data loss, etc.). As the number of systems that support the various architectures increase, the complexity of the database system likewise increases. In some settings, management of the database system becomes as complex as the architecture itself, and can overwhelm administrators who need to make changes on large distributed databases.

SUMMARY

Stated broadly, various aspects of the invention cover automating management functions for use in distributed database systems. According to some embodiments, automation systems enable administrative users to build distributed databases from scratch, implement architecture changes within the distributed databases, and/or manage upgrades to the database software as an input into the automation system of a desired goal state for a distributed database.

According to one embodiment, the automation system is configured to automate any administrative task, such that the end user can input a goal state (e.g., create database with a five node architecture) and the automation system generates and executes a plan to achieve the goal state without further user input. In further embodiments, the automation system automates management functions on existing databases (e.g., update source code for database, re-configure hardware architecture, provision new systems, build indexes, select a storage engine, etc.) by assessing a database current state compared to a goal state, generating a plan between the states, and monitoring execution of the plan for any deviation.

In one embodiment, an execution plan includes a series of steps, where each steps defines the operations to execute to transition to a next state. In some examples, generating the execution plan can include accessing pre-defined state definitions associated with nodes in the distributed database (e.g., software version, replication status, database role, etc.). Each pre-defined state can be matched to a current state of one or more nodes (e.g., systems hosting data or managing data in the distributed database). The pre-defined states can also include the operations to execute to transition to other pre-defined states. According to one embodiment, a search through the pre-defined states can determine a path from the current state of the database, through a number of other pre-defined states that reach the goal state. In one example, the results of the search provide the execution plan as a series of steps through a series of pre-defined states (and e.g., the operations to execute to transition between the pre-defined states).

In further embodiments, the pre-defined states can include definitions of pre-conditions to validate before starting any transition and/or confirming that the current database state matches the definitions in the pre-defined state. In yet other embodiments, each pre-defined state also includes definitions for post-conditions to determine that the operations defined for transitioning from that pre-defined state are executed correctly. In some embodiments, the automation system is configured to validate pre-conditions as part of determining a current state of the database and validate post-conditions as part of executing the operations to transition to a next state. In one example, if the pre-conditions and post-conditions are validated, the automation system has performed a check on the transition from a first state to a second state. Each such transition can be tested and validated along a path to an ultimate goal state. According to one embodiment, the execution checks improve the efficiency in execution of database management operations. For example, efficiency is improved by reducing error, and ensuring consistent execution.

According to some embodiments, the automation system can be configured to test current state by querying database information irrespective of pre- and post-conditions. In some examples, the automation system can be configured to revisit an execution plan or path and regenerate or dynamically create a new path based on any changes in state, any errors in execution (e.g., failed post-conditions), among other options.

According to another aspect, bringing existing database systems into automated management can be as complex as designing the database itself. For databases that pre-existed automation functions and automation components or were never configured for automation, integrating the automation components and/or re-architecting the database for automation can prevent adoption. According to some embodiments, the automation system is configured to analyze existing database systems, coordinate with and/or install monitoring components (e.g., applications, daemons, etc.) within the existing database, and generate execution pathways to integrate automation control systems into the existing database. In one example, the automation system is configured to analyze an existing database architecture to determine a current state. Based on the current state information, the automation system is configured to generate an installation pathway of one or more intermediate states to transition the existing system from no automation and/or no automation components to a goal state having active automation agents distributed throughout the database (e.g., on each node of the database). In further examples, the automation system is specially tailored for use in non-relational database systems. In one instance, the automation system is configured to install itself into existing MONGODB™ databases (MONGODB™ is a well-known cross-platform document-oriented database).

According to one aspect, a system for automatically integrating automated management into a distributed database is provided. The system comprises at least one processor operatively connected to a memory, a state component, executed by the at least one processor, configured to determine a current state for a plurality of database nodes, wherein the current state determination identifies missing or inactive automation functions, a planning component, executed by the at least one processor, configured to generate an execution plan to upgrade the database nodes from the current state to a goal state, wherein each node of the plurality of database nodes is configured to execute stepwise the execution plan response to accessing the execution plan, wherein the execution plan includes operations executed by the at least one processor to automatically install or enable automation agents on respective nodes within the distributed database responsive to the determination of missing or inactive automation functions; and automation agents, executed by the at least one processor, configured to access the execution plan, identify any configurations required to enable automation, run any operation specified in the execution plan, update configuration metadata for the distributed database, and validate automation functionality is properly installed.

According to one embodiment, the system further comprises a database of pre-define states, wherein the pre-defined states establish potential distinct states and associated operating characteristics for each state of the database. According to one embodiment, the pre-defined states include at least one relationship to at least one other pre-defined state and one or more operations that are executable to transition from a first pre-defined state to a second pre-defined state. According to one embodiment, the state component is configured to match a goal state to a pre-defined state in the database of pre-defined states. According to one embodiment, the state component is configured to match a current state of one or more database nodes to a pre-defined state in the database of pre-defined states. According to one embodiment, the planning component is configured to execute a search on the pre-define states and on transition information between the pre-defined states to generate the execution plan.

According to one embodiment, the plurality of pre-defined states in the database include data fields for pre-execution requirements. According to one embodiment, the automation agents are configured to retrieve the pre-execution requirements and validate the current state against the pre-execution requirements. According to one embodiment, the plurality of pre-defined states in the database include data fields for post-execution requirements. According to one embodiment, the automation agents are configured to validate a post execution state of the database against the post-execution requirements. According to one embodiment, the automation agents are further configured to trigger the state component and planning component to evaluate the post execution state of the database and generate a new execution plan from the post execution state to the goal state in response to failed validation.

According to one aspect, a computer implemented method automatically integrating automated management into a distributed database is provided. The method comprises determining, by a computer system, a current state for a plurality of database nodes, the act of determining the current state including identifying missing or inactive automation functions, generating, by the computer system, an execution plan to upgrade the database nodes from the current state to a goal state, wherein each node of the plurality of database nodes is configured to execute stepwise the execution plan responsive to accessing the execution plan, wherein generating the execution plan includes identifying operations to execute to automatically install or enable automation agents on respective database nodes within the distributed database responsive to the determination of missing or inactive automation functions, and accessing, by the computer system, the execution plan, identifying, by the computer system, any configurations required to enable automation function, updating, by the computer system, configuration metadata for the distributed database, and validating, by the computer system automation functionality is executing.

According to one embodiment, the method further comprises an act of accessing a database of pre-define states, wherein the pre-defined states establish potential distinct states and associated operating characteristics of each state of the database. According to one embodiment, the method further comprises executing, by at least one automation agent, a transition from a first pre-defined state to a second pre-defined state based on at least one relationship between the first and second pre-defined states and one or more operations that are executable to transition between the first and second pre-defined state. According to one embodiment, the method further comprises an act of matching a goal state to a pre-defined state in the database of pre-defined states.

According to one embodiment, the method further comprises an act of matching a current state of one or more database nodes to a pre-defined state in the database of pre-defined states. According to one embodiment, generating the execution plan further comprising an act of executing a search on the pre-define states and on transition information between the pre-defined states to generate the execution plan. According to one embodiment, the plurality of pre-defined states in the database include data fields for pre-execution requirements and wherein the method further comprises: retrieving, by at least one automation agent, the pre-execution requirements, and validating, by at least one automation agent, the current state against the pre-execution requirements.

According to one embodiment, the plurality of pre-defined states in the database include data fields for post-execution requirements, and wherein the method further comprises validating, by at least one automation agent, a post execution state of the database against the post-execution requirements. According to one embodiment, the method further comprises, evaluating the post execution state of the database, and generating a new execution plan based on the post execution state and the goal state, in response to failed validation.

According to one aspect a system for automating database management is provided. The system comprises at least one processor operatively connected to a memory, a collection, stored in the memory, defining a plurality of database states, the database states including defined operations to execute to transition from a current state to a next state, automation agents executing on respective ones of a plurality of database nodes within a distributed database, wherein a respective automation agent is configured to monitor a respective database node to determine a current state, access a definition of a goal state, generate an execution plan to transition the respective node from a current state to the goal state, and wherein the at least one processor is configured to analyze, automatically, database performance information, generate, automatically, a goal state responsive to determining an improved configuration of the distributed database, and communicate the goal state to the automation agents to achieve the improved configuration.

According to one embodiment, the collection of the plurality of database states further comprises data attributes establishing a plurality of distinct states and associated operating characteristics for each state of the database. According to one embodiment, the plurality of states comprise a plurality of pre-defined states, wherein the plurality of pre-defined states include at least one relationship to at least one other pre-defined state and one or more operations that are executable to transition from a first pre-defined state to a second pre-defined state. According to one embodiment, the system further comprises a state component, executed by the at least one processor, configured to match a goal state to a pre-defined state in the collection of database states. According to one embodiment, the state component is configured to match a current state of one or more database nodes to a pre-defined state in the collection. According to one embodiment, the system further comprises a planning component configured to execute a search on the collection of database states and including transition information between the database states to generate the execution plan.

According to one embodiment, the collection includes a plurality of pre-defined states in the database and respective data fields storing pre-execution requirements. According to one embodiment, the automation agents are configured to retrieve the pre-execution requirements and validate the current state against the pre-execution requirements. According to one embodiment, the collection includes a plurality of pre-defined states in the database and respective data fields for post-execution requirements. According to one embodiment, the automation agents are configured to validate a post execution state of the database against the post-execution requirements. According to one embodiment, the automation agents are further configured to trigger re-evaluation of a post execution state of the database and generate a new execution plan based on the post execution state in response to failed validation.

According to one embodiment, the at least one processor is configured to identify an opportunity for the improved configuration based on provisioning one or more additional database nodes, and generate the goal state to include the one or more additional database nodes in the database architecture. According to one embodiment, the at least one processor automatically communicates the goal state to the automation agents, and triggers generation and execution of the execution plan.

According to one embodiment, the at least one processor is configured to generate the goal state to includes a new index, in response to analyzing database performance information. According to one embodiment, the at least one processor is configured to generate a recommendation for an optimization, and communicate a new goal state to the automation agents responsive to receiving and acceptance signal for the recommendation. According to one embodiment, the automation system includes multiple operation modes, wherein in the first operation mode the system automatically executes optimizations, and wherein in the second operation mode the system presents optimizations for acceptance.

According to one aspect, a system for automating database management is provided. The system comprises at least one processor operatively connected to a memory, a collection, stored in the memory, defining a plurality of database states, the database states including defined operations to execute to transition from a current state to a next state, a replica set a comprising a primary node and primary copy of data from the distributed database, and at least one secondary node hosting a copy of the primary data which is configured to receive replicated operations from the primary node to update the copy of the primary data, automation agents executing on respective nodes of the replica set, wherein a respective automation agent is configured to monitor a respective database node to determine a current state, access a definition of a goal state, generate an execution plan to transition the respective node from a current state to the goal state, and execute the execution plan to rotate an encryption key from a current encryption key to a new encryption key on each data hosting node of the distributed database.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
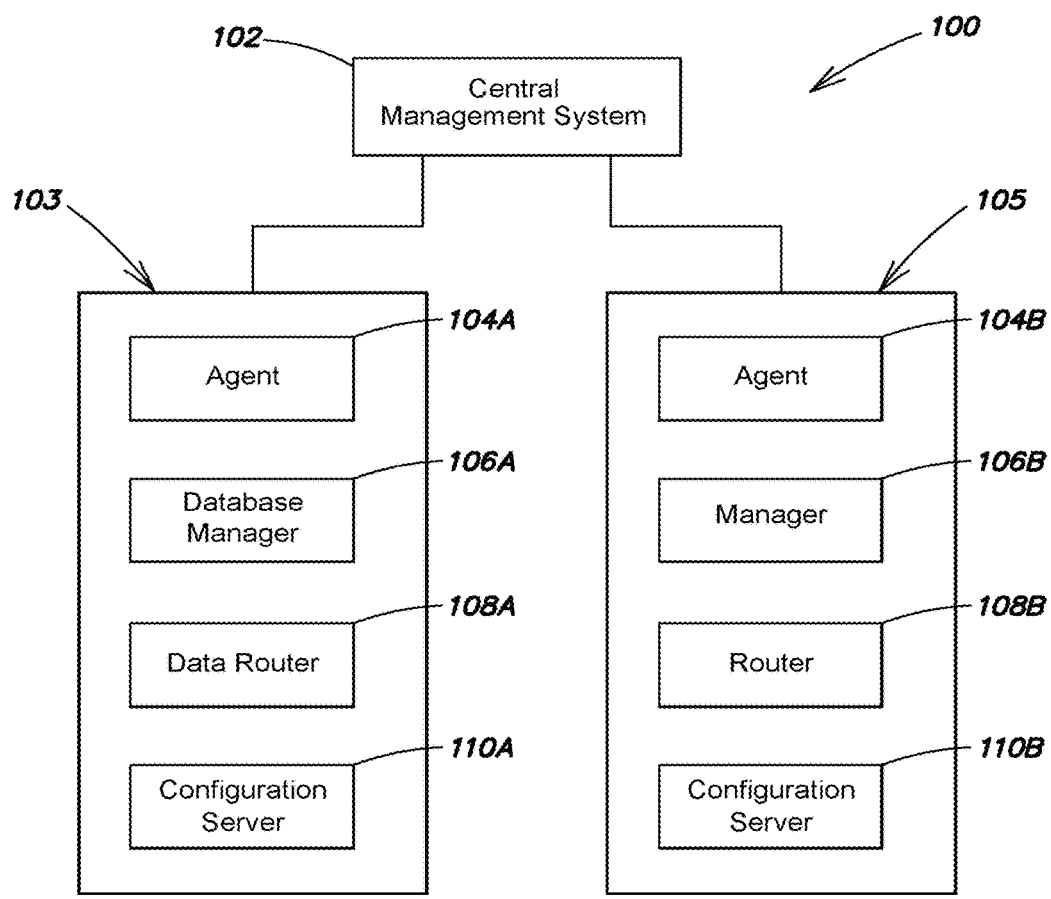
FIG. 1 is a block diagram of an automation system, according to one embodiment.

It is realized that although increasing requirements on data storage, data access, and timeliness can be handled through scaling database implementations, many trade-offs exists as database architectures increase in size and complexity. For example, as distributed databases increase in scale administration tasks increase in complexity, and can overwhelm administrative personnel. Even in smaller implementations, the requirements associated with building and maintaining distributed databases can be daunting. Accordingly, various aspects provide automation of many of the administrative tasks that complicate changes in database architecture, upgrading database source code, hardware reconfiguration and/or expansion, as well as automating the integration of automation services. The integration of automation into distributed databases improves execution of the respective database systems. Automation of maintenance tasks reduces errors in administration, decreases time to adoption of updates, and can automate optimizations on data accessibility (e.g., improving the execution of the entire database). In one example, the automation system can be configured to automatically provision new database resources or build new indexes in response to analyzing database performance information (e.g., load, read/write volume, data distribution, most accessed data, etc.). In another example, dynamic recommendation and/or automatic implementations of such optimization increases database performance significantly.

According to one aspect, the automation system is specially configured to automate introduction of the components and functions necessary to automate database management into existing systems that do not have automation enabled. According to one embodiment, the automation system is configured to interrogate the systems making up a distributed database, and determine what elements are lacking from the distributed database (e.g., automation agents, databases for reporting state, status, etc., state mappings for generating execution plans, and processes for actively monitoring state and/or transitioning to new states, among other options). In one example, the system is configured to generate an execution plan to transition from a current state to a goal state including the necessary automation components. The execution plan can include a number of intermediate states. In some examples, each state provides an additional feature or modification of one or more configurations that enable further transitions to the goal state. In some embodiments, each transition to a new state can be validated by the automation system, and if errors occur the automation system can re-generate an execution plan to transition from the new state (i.e., current error state) to the original goal state.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, any combination of, and all of the described terms.

FIG. 1 illustrates a block diagram of an example architecture 100 of an automation system integrated within a distributed database. The automation architecture 100 includes a central management system 102 that communicates with a plurality of automation agents 104A and 104B. In one embodiment, the automation agents are monitoring processes, applications, and/or daemons. The automation agents are configured to interrogate database systems to determine information on the current database installation. For example, the agents are configured to capture information on any one or more of the following: a current database software version, database architecture, database replication model, database metadata, and/or database configuration settings, among other options. In some examples, the automation agents are configured to run on each of the databases system in the distributed database. In other embodiments, the automation system can be configured to upgrade functionality of existing monitoring processes within the distributed database, and have the upgrades monitoring processes perform the automation agent functions.

According to one embodiment, the automation agents are distributed throughout the systems that make up the distributed database. Shown by way of example are systems 103 and 105, which host elements of the distributed database. According to one embodiment, the distributed database may include additional systems that make up the distributed database (e.g., any number of underlying systems like 103 and 105 may host copies of the database data accessible through database manager processes or services (e.g., and have respective processes or services like 106A or 106B), or host copies of portions of the database data, each which is made accessible via database routers (e.g., like 108A or 108B), and database manager processes or services (e.g., like 106A or 106B)). The systems that make up the distributed database are referred to as database nodes.

In further embodiments, the distributed database may include the well-known MONGODB database, and can be architected based on, for example, replica sets, as described in U.S. patent application Ser. No. 14/064,705, the disclosure of which is hereby incorporated by reference. In other embodiments, the distributed database may be based on a sharded architecture, for example, described in United States Publication 2012-0254175, and patent application Ser. No. 13/078,104, incorporated herein by reference in its entirety. Either architecture, alone or in combination, can be augmented via automation agents 104A-B.

According to one embodiment, the metadata defining the database architecture is hosted on configuration servers (e.g., 110A and 110B). In the illustration, there is a configuration server shown on each node or system of the distributed database. In one example, automation agents are configured to detect and/or query configuration metadata from configuration servers. The automation agents can use the configuration metadata to determine a current state for the database. According to various embodiments, database nodes can be implemented on separate systems where each node includes the elements needed to manage data and handle data requests. Each node can be implemented as cloud based instances, on physical systems, and multiple nodes can be implemented on singular systems or cloud based instances, among other architectures.

According to various architectures, the automation agent should be present on each database node, to ensure that each node can be controlled automatically. In some examples, low priority systems may not require automation agents as automated control may not be required. In further embodiments, automation can be introduced into a distributed database that pre-existed the automation functionality as discussed in greater detail below. Various architectures of distributed databases are discussed in the incorporated subject matter, for example, with respect to replicas sets and sharded architectures. For example, a distributed architecture can include three configuration servers, one or more router processes, and any number of database instances (e.g., 106A and 106B) to support data access needs. Automation agents can be introduced into such an architecture and manage automatic execution of administrative functions, that can even modify the existing architecture.

According to some embodiments, the automation agents 104A and 104B are each configured to automate maintenance and/or administrative tasks on the distributed database. For example, the automation agents are configured to automate initial construction of a distributed database. In one example the automation agents are configured to instantiate systems and install the MONGODB database instances on a user specified number of database systems or nodes, according to configurations supplied by an end user. According to one embodiment, an end user can access a central management system (e.g., 102), to view user interfaces that prompt the user to define configurations for creating a distributed database (e.g., number of nodes, database version, virtual machine information (e.g., instance type (e.g., AWS Linux, UBUNTU Server, etc.—see FIG. 7 described in greater detail below), configuration server settings, listening port, etc.).

According to some embodiments, the automation agents are configured to manage administrative tasks on the database as a series of states. The automation agents are configured to determine a current state of a system (e.g., a database node) and are configured to receive instructions on a goal state for the database and the systems that make up the database. Based on the current state and the defined goal state, the automation agents create an execution plan to take a respective database node from the current state to the goal state. In one example, first a current state of the node is determined or provided. The automation agent matches the current state of the node to a pre-defined state. The pre-defined states include operations to execute transitions to other states. The pre-defined states and associated transitions can be searched to determine a path between current state and the goal state.

In another example, the automation agents execute a breadth first search through the plurality of defined states to identify an optimal execution plan from the current to goal state. The breadth first search is an algorithm for traversing or searching tree or graph data structures. The pre-defined states and the transition can be stored, for example, as a tree or graph data structure. A breadth first search starts at a tree root or an arbitrary node of a graph (e.g., sometimes referred to as a search key) and explores the neighbor nodes first, before moving to the next level neighbors to determine if there exists a path between the starting node and a node that represents the goal state. Other search algorithms can be used to find paths between a current state and a goal state made up of the pre-defined states. For example, a depth first search can be used to start at a root node or some arbitrary node in a graph, and explore as far as possible along a branch of the tree or graph before backtracking. The first branch that connects the database current state to the goal state can then be used as the execution plan.

The automation agent then executes the each step of the execution plan on the respective node. In some embodiments, the automation agents implement loose concurrency control, by posting automation operations to a community board or to a local database location accessible by other automation agents. For example, each automation agent can check the board to ensure only one agent is executing upgrades at one time. In another embodiment, automation agents can query databases on other nodes to determine what automation activity is occurring on other nodes, if any.

Figure 2:
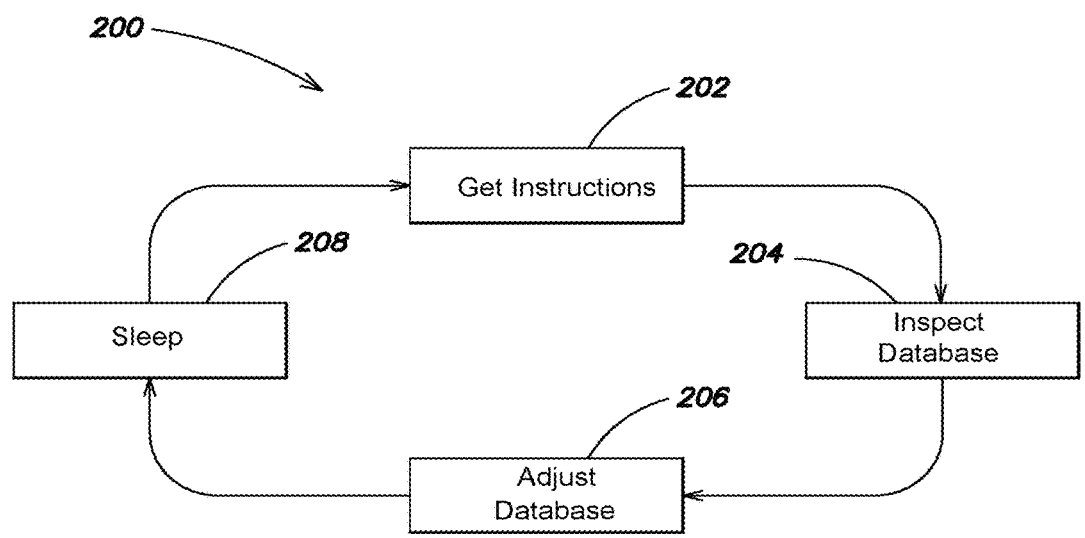
FIG. 2 is a process flow for adjusting a database configuration, according to one embodiment.

FIG. 2 illustrates a cyclic logic flow for automation agent operation. The cyclic logic flow 200 begins, for example, at 202 with receipt of instructions defining a goal state (e.g. from central management system 102). The automation agent (e.g., 104A) inspects current state (e.g. at 204) of the system it is installed on (106A) and, for example, can inspect current state of other systems in the cluster (e.g., 106B). Based on current state and the goal state, the automation agent defines an execution plan and steps through the execution plan to adjust the node and/or database cluster at 206. Each step in the execution plan can be conducted as a cycle through flow 200, where the automation agents sleep (e.g., 208) for a time between adjustments (e.g., 206) and getting instructions to achieve a next state (e.g., 202).

In some examples, the automation agent is configured to validate proper execution of each step of an execution plan. In one example, each of the plurality of defined states includes information on pre-conditions that must be met before execution, operations to execute to achieve another state, and post conditions to validate proper execution of the operations. In one embodiment, validation may occur based on determining the post conditions have been achieved. In another embodiment, the automation agent checks current state of the system, node or database, after each adjustment and determines the execution plan still applies. In one example, evaluation of current state may identify an unexpected state (e.g., an error occurred in execution), triggering generation of a new execution plan to achieve the goal state. The automation agents can be configured to generate the new execution based on determination of the current state of a node or system, and execution a first step in the new execution plan moving the node toward goal state. For example, the automation agent executes the cycle depicted in FIG. 2 ultimately reaching the goal state. Process 200 may continue to execute, receive new goal state information (e.g., update database software version), and execute to bring each node or system in a distributed database to the goal state.

According to another aspect, bringing existing systems into automated management can be difficult and subject to error. For databases that pre-existed automation, a central system (e.g., 102) can be configured to manage introduction of automation components and functionality into existing databases. According to some embodiments, the automation system is configured to analyze existing database systems and architecture, capture and/or install monitoring components within the existing database, and generate execution pathways to integrate existing database systems with automation control systems. In one example, the automation system is configured to analyze an existing database to determine a current state. The analysis can be performed for each node making up the distributed database. Based on the current state information the automation system is configured to generate an installation pathway of one or more intermediate states to transition the existing system from no automation and/or no automation components to a goal state having automation agents distributed throughout the database.

For example, where no monitoring is currently in place the central server can be configured to first install a monitoring application on systems within the database. As part of a transition between a no monitoring state and a monitoring enabled state, the pre-defined states can include pre-condition test to ensure the central server has permissions necessary to install monitoring capabilities. In other examples, the central server can determine that an existing database has monitoring functions/application that are not running or enabled. An execution plan can transition the database to active monitoring in such settings. In one example, pre-conditions can include testing permissions of the central server to make such modifications to the database. Various known database systems have known architectures and known functionality (e.g., including monitoring), and establishing monitoring in such settings can include activating current functionality. Further, once monitoring is enabled the central server and/or monitoring processes can identify any steps to introduction automation functions (e.g., as identified in the pre-defined stats and transitions). In one embodiment, the central server is configured to distribute the pre-defined states as a local database accessible by any existing monitoring processes.

According to one embodiment, as part of the upgrade to automation, the existing monitoring processes can be updated and/or replaced with similar processes providing the same or enhanced monitoring functions coupled with search functions for plurality of pre-defined states. The search execution generates a plan to move from monitoring only to full automation. As discussed existing monitor processes can be augmented to match current state to a pre-defined state, and also search the pre-defined state to identify a path from the current state to a goal state. According to one example, once monitoring applications can match current state and generate an execution plan, a last validation check can ensure that the monitoring applications have permission to execution any and/or all operations defined in the plan. If not, the automation system can request such permission or automatically elevate permissions of the monitoring processes until validated. In other embodiments, new executables with the necessary permission can be generated at central server and distributed throughout the database to accomplish the transition to full automation functionality.

In further examples, the automation system is specially tailored for use in non-relational database systems, and in one instance the automation system is configured to install itself into existing MONGODB™ databases. For example, the automation system includes pre-defined states for: activating monitoring functions in a MONGODB™ database, augmenting monitoring processes with execution privileges, attaching local databases (e.g., pre-defined state databases) to monitoring/automation applications, distributing new executables incorporating automation functionality, etc. The pre-defined states can also include operations/states for other known database implementations.

Figure 3:
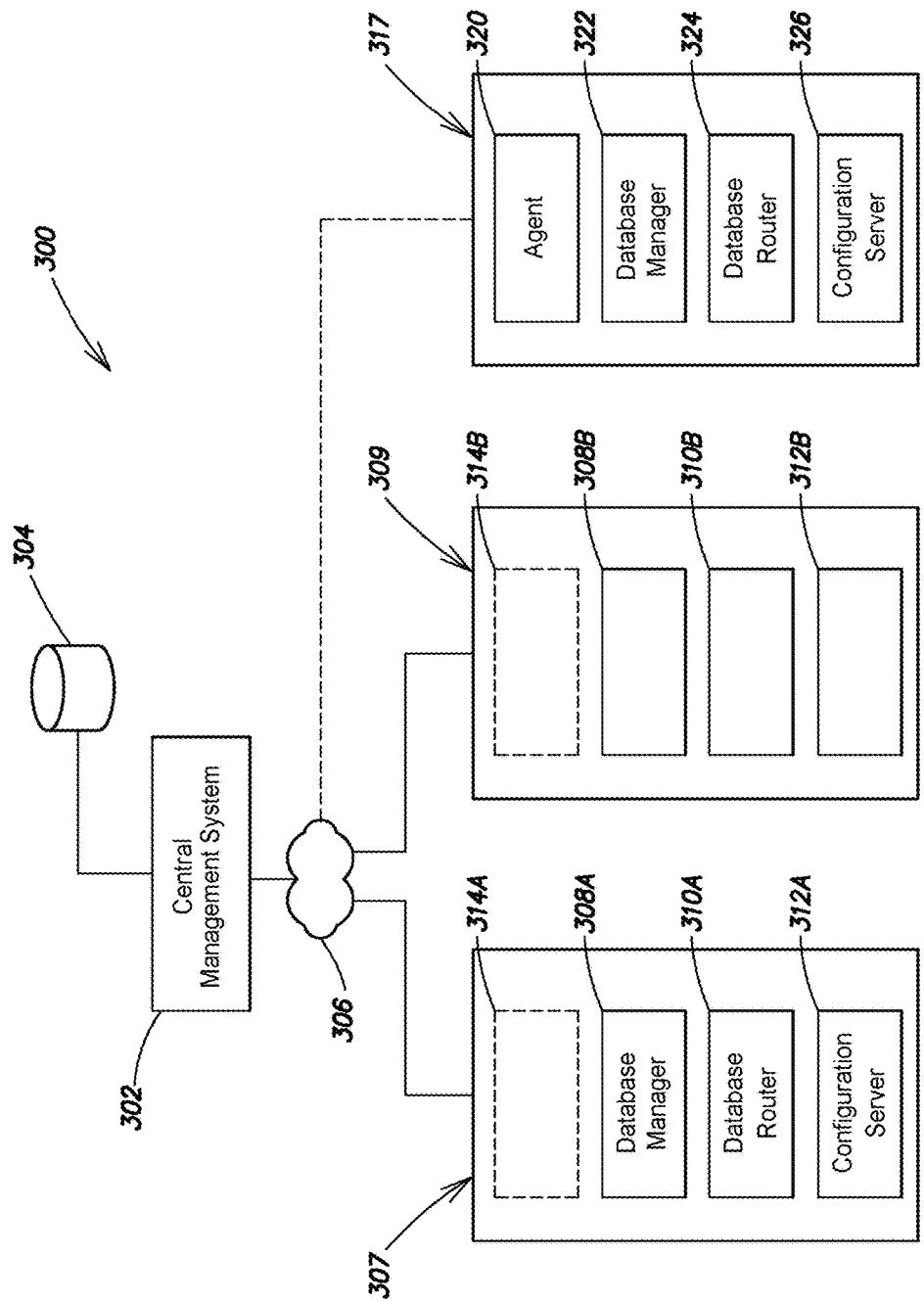
FIG. 3 is a block diagram of automation integration into an existing database, according to one embodiment.

FIG. 3 illustrates an existing distributed database architecture of two nodes 307 and 309 that do not include automation in their original configuration. Other architectures include additional nodes and according to some embodiments, automation can be introduced into architectures spanning any number of nodes. The system architecture 300 includes a central management system 302 that can communicate with a plurality of database nodes (e.g., 307 and 309), for example, over a communication network 306.

The communication network can be a local area network, wide area network, private network, cloud instantiated network, etc. The database nodes (e.g., 307 and 309) include the components necessary to operate the distributed database (e.g., database managers 308A and 308B, database routers 310A and 310B, and configuration servers 312A and 312B). Each node can be configured to service database requests from clients, update database records, and manage workload, among other functions.

Shown in dashed line at 314A and 314B, are monitoring processes or agents. Nodes 307 and 309 may or may not have monitoring processes installed initially. The central system 302 can determine whether the nodes 307 and 309 have monitoring installed and further whether installed monitoring processes report current state of the database and/or database nodes.

According to one embodiment, the central management server 302 can access any binaries or executable files for the distributed database. For example, the central management server 302 can access and communicate executable files (e.g., from a binaries database 304) for monitoring processes to the database nodes 307 and 309, if the server 302 determines that no monitoring capabilities are present. In some examples, monitoring processes may already be present on the nodes. For example, at 314A and 314B, respective monitoring processing can collect information on their respective nodes to create current state information. The current state information can be reported to the central management server 302, and the server 302 can determine if the nodes are capable of being upgraded to automated management. For example, the server 302 can test the current state of each node to determine a current version of the database software, and validate an execution pathway exists for the current version. In one embodiment, certain software versions are known not to support automation. In such settings, searches through the pre-defined states would not return a fully automatic path. For known versions that do not support automation, the automation system can provide notifications regarding minimum necessary versions, and any steps to take to bring a database into a capable configuration (e.g., capable of automation integration).

If the current state can support automation, a search through the pre-defined states yields a path between current state and a goal state. For example, the path defines the execution plan which can include steps for upgrading monitoring processes to automation agents, or modifying database configurations (e.g., at configuration servers 312A and 312B) for the monitor processes to give them execution permission for associated database nodes.

In some embodiments, some customizations can prevent automation from being able to integrate with an existing database. In one example, older versions of the database software are not compatible with automation, or if there are no pre-defined states connecting the current state of the database to a goal state of the same database having active automation agents. The central management server 302 can report such failure conditions to administrators of the analyzed database. In some examples, the automation system can identify the error causing condition for potential resolution (e.g., software version out of date, configurations not proper, unsupported operating system, permissions not set properly, etc.).

In another embodiment, the central management server 302 can deliver automation agents to the nodes 307 and 309 from the binaries database 304. Once installed, the automation agents can then determine a current state of each respective node (e.g., software version, hardware, configuration settings, architecture, etc.). In some embodiments, the automation agents are not configured to communicate directly with each other, however, the automation agents can be configured to store current state information on a local database queriable by other automation agents. Based on analysis of the current state, the automation agents validate the database for integration of full automation functionality. In one embodiment, the automation agents utilize an existing API to communicate with the database the agents manage.

In other embodiments, the automation agent can report current state to the central management server 302, and validation can occur at the central management server 302. In some embodiments, the automation agents are installed at nodes 307 and 309 with information on a plurality of defined states. The automation agents execute a search within the plurality of defined states to create an execution plan of one or more steps. Each step in the execution plan is based on the plurality of defined states and the operations associated with each state to transition a node from a current state to a next state in the execution plan. For existing databases without automation, the system automatically defines the goal state as a mirrored database (e.g., database with the same data and architecture) with automation components and functions configured and enabled.

According to one embodiment, the automation system and/or central management system 302 can be configured to instantiate a new database node (e.g., 317) to transition an existing database to automated control. The new database node is instantiated with the same components as a mirrored node (e.g., 307). In one example, the mirrored node is instantiated to have all the same components as the original node being upgraded—in essence a mirror of the original nodes (e.g. same data, same configurations, same architecture except where automation requires new settings). In the example shown, node 317 is built to include a database manger 322, database router 324, and configuration server 326. The new node can function from a user perspective exactly like the mirrored node. Based on how the node is created, database management operations can occur directly via the database manager 322, or alternatively the database node can be created as a service where the automation agent 320 is executed first and runs the database instance as a service under the automation agent's control.

According to various embodiments, the architecture of the database as conventional hardware or executed as a service is a decision made by administrators. In further embodiments, the automation system can provide recommendations to administrators on how automation will be introduced. For example, a local database system can be converted from conventional hardware to a cloud based database service as part of automation integration. In further examples, the automation execution can instantiate mirror nodes as a cloud based service with an integrated automation agent, while preserving the hardware based database node. In one example, the execution plan can be configured to move processing from the original nodes over to the newly instantiated node for proving performance in the new configuration. In some embodiments, the automation agent or automation system creates an execution plan for returning to the database to a prior configuration, and/or provides selections in user interface displays for returning to the original configuration.

Figure 4:
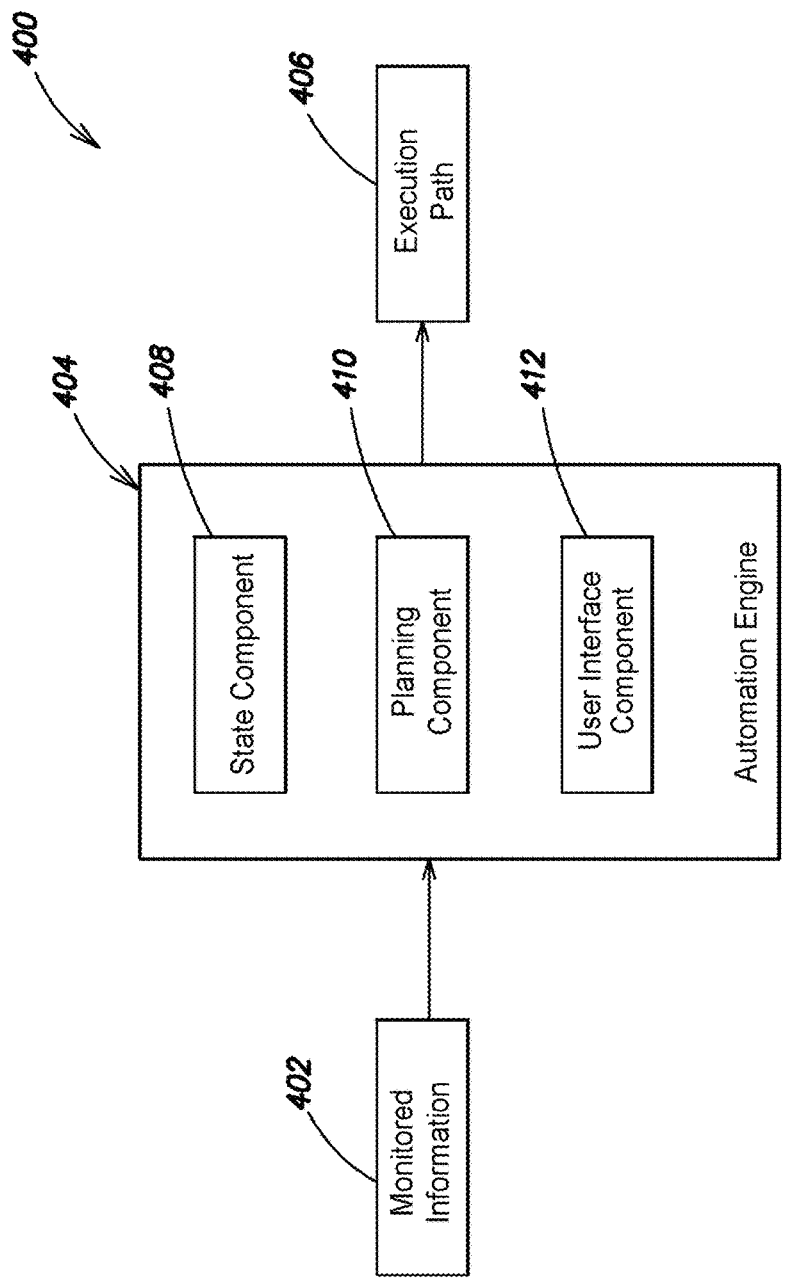
FIG. 4 is a block diagram of an automation system, according to one embodiment.

According to one embodiment, an automation system 400, FIG. 4, can include user interface screens that are displayed to administrators of the database system via a user interface component 412. According to one embodiment, the automation system 400 includes an automation engine 404 configured to report on current state based on monitored information 402 from the nodes making up the database. In one example, the automation engine is a processing entity configured to execute the function discussed above with respect to automation operation, and can in other examples, also execute the functions discussed below with respect to the various system components. The automation engine can be executed on special purpose computer systems (see e.g., FIG. 10), and may also be distributed across a plurality of computer systems.

According to one embodiment, the system includes a state component 408 configured to determine the current state of the database and/or individual nodes responsive to receiving the monitored information 402. In some embodiments, the state component 408 can validate that the current state is capable of integrating automation components and functionality. In other embodiments, validation can be executed by a planning component 410 that searches a database of predefined database states for an execution plan (e.g., 406) between current state and a goal state, where goal state includes the database with automation components and functions. In other examples, the planning component can be configured to execute validation tests for integrating automation into an existing database system prior to searching for a valid execution plan. For example, the system 400 and/or planning component 410 can apply exclusion criteria (e.g., software too old, minimum hardware not found, etc.) to validate the database and/or the node within.

According to one example, the system 400 and/or engine 402 includes a user interface component 412 configured to generate user interface displays to report the status of the validation testing. In on example, the automation system provides a display showing the capability to integrate automation, and requests that an administrative user initiate the integration operation (e.g., execution of the execution plan) via the display. In other embodiments, the automation system can be configured to automatically trigger automation integration, and provide options in the user interface to set the level of automation function for a database. For example, the automation system can be configured, for example, to monitor only (e.g., capture information through automation agents), report through the user interface on automation operations that can be executed (e.g., suggest indexes for improving system performance, generate backups, provision new systems for expanding database, etc.), and automatically trigger optimizations via determined execution plans, among other options. Each of the automation states can be triggered responsive to administrator selection. In other examples, a system default selection can be set (e.g., report on available automation operations), and triggered automatically. User interface displays are then configured to confirm the default or override the default setting responsive to user input.

Figure 5:
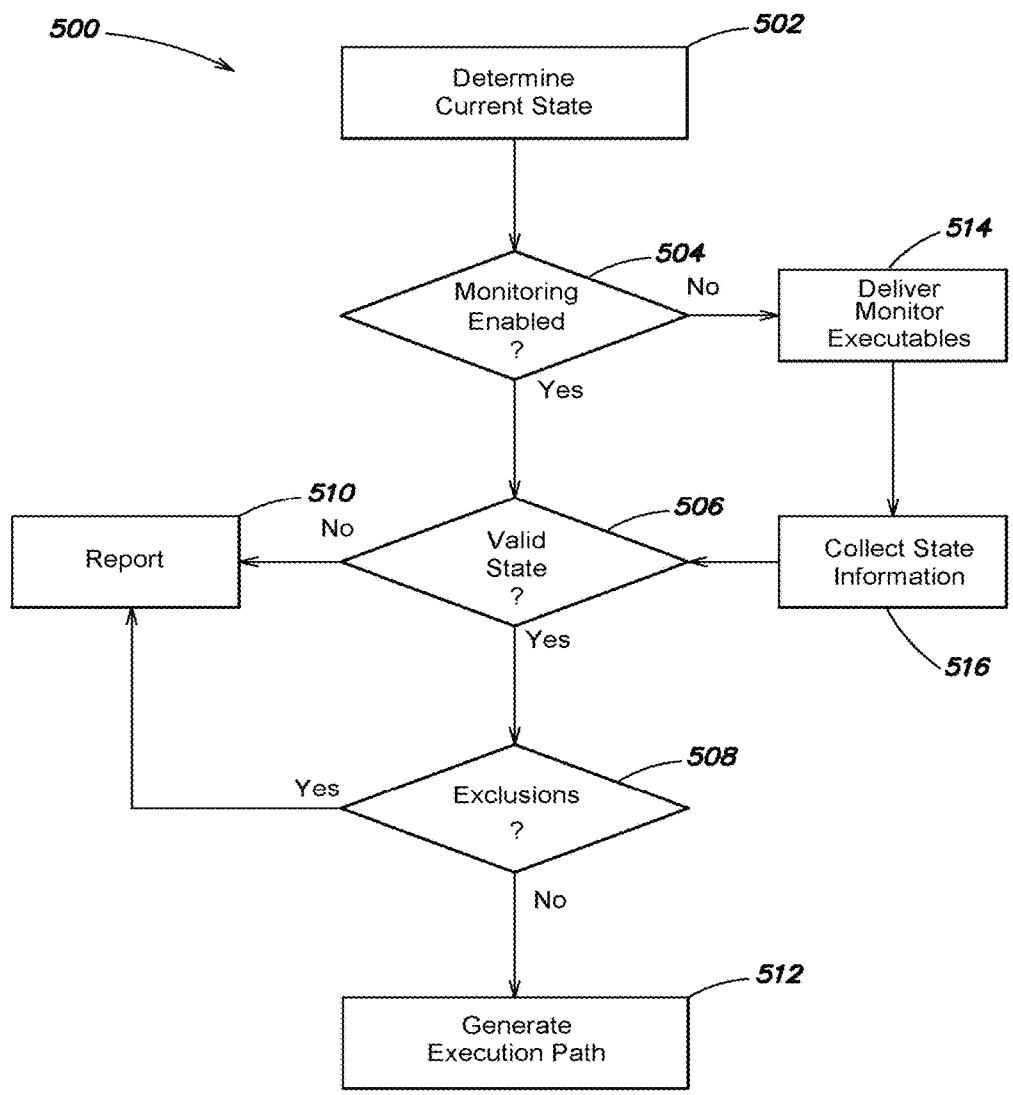
FIG. 5 is an example process flow for integrating automation into an existing database, according to one embodiment.

FIG. 5 is a process flow 500 for generating an execution plan that can be executed to incorporate automation into existing database systems. For example, process 500 can be executed by the automation system 400 or its components, or executed by a central management server, monitor processes, and/or automation agents executing on database nodes within a distributed database.

Process 500 begins with determining current state at 502. In some embodiments, the current state indicates that no information is available or automation functions have not been installed. In one example, existing database system may or may not have any automation functionality installed. In further examples, existing systems may not have any state monitoring capabilities installed either. If monitoring is enabled 504 YES, information can be collected on an installation of a distributed database. The collected information can include state information on each node within the database. For example, each node within the database may be analyzed to determine any one or more of the following features: current software version(s) (e.g., database manager version, monitoring software version, configuration metadata for the database (e.g., database size, number of nodes, data distribution, replica set information, network information, partition or shard information, cluster information, etc.—examples of configuration metadata is described in co-pending U.S. patent application Ser. Nos. 13/078,104 and 14/672,901, incorporated by reference herein), existing hardware, hardware utilization, data metrics (e.g., data request volume, timing, load, etc.), defined indexes, encryption settings, authentication settings, database profiling settings and/or information, backup status, backup location, etc. In some examples, even if monitoring is enabled, monitoring processes must be modified and/or upgraded to capture all the data on a database desired. In such examples, the process 500 can continue via 504 NO when new executables may be required.

Where monitoring is enabled 504 YES, the monitored information is analyzed to determine if the database and respective nodes are in a valid state at 506 and if any exclusions apply 508 to prevent integration or execution of automation functions. Testing for valid state and exclusions are shown separately in process 500. In other embodiments, exclusion testing can be executed first or executed in conjunction with state testing. If either test does not pass 506 NO or 508 YES, process 500 concludes with reporting at 510 on the condition or conditions that cause the issue. Generally, current state for automation integration is evaluated based on the database's architecture, software versions of the database processes on respective nodes, and available hardware, where applicable. Software versions too old to upgrade can be identified as an invalid state, or based on an exclusion rule identifying software too old to integrate with automation. Other exclusions may apply 508 YES, where authentication settings do not allow automation agents to manage database configuration metadata, or limit privileges of the automation agents.

An example of pseudo-code that may be executed by an automation system, system components, and/or as part of process 500 includes:

```
eval.ver($currSoftver(node))   // evaluates software version for each node valid
                               // against valid versions and known too old
    if $curSoftver < min_auto_version then report error
                               // minimum automation software required (v. 2.0) or min date
    ...
    else eval.ver.state = pass
        generate.path( )           // breadth first search of
            search( ) db.state     // states - find path from current state
                                   // to goal
```

If a valid state is found 506 YES and no exclusions prevent integration 508 NO, process 500 continues with generation of an execution plan at 512. Generation of the execution plan can include searching through a plurality of defined database states. Each state can include, for example, pre-conditions, post-conditions, and operation(s) to execute to transition from one state to another state. The search operation can be configured to find a path from the known current state to a defined goal state. For example, with automation integration the goal state is based on the current state detected, with automation agents installed on each database node to be managed. The goal state can include database configuration specifications. The configurations can specify reporting information, common naming conventions (e.g., naming of automation agents, addressing of central server, addressing of nodes, etc.), topology, among other options. The automation agents are configured to modify configurations to achieve the goal state. Other goal states are described with greater detail below, and steps of process 500 can be executed to achieve different goal states.

Retuning to process 500, if monitoring is not enabled 504 NO, monitoring executables can be communicated at 514 and installed to collect state information at 516 on a distributed database. In some examples, the monitoring processes can be fully executable automation agents. In one embodiment, the automation agents are communicated with monitoring functions enabled. Full automation control can then be activated as part of running the execution plan from current state to goal.

According to another embodiment, how automation is integrated into existing database system can depend on the underlying architecture of the distributed database. For example, cloud based database system can leverage the ability to generate new database nodes by provisioning new database instances. The new instances can be provisioned with automation agents, and instantiation of the database managers can occur directly under the control of the automation agents. In various embodiments, predefined database states encompass cloud based architectures, pre-conditions that are tested for cloud based states, operations specific to cloud based states (e.g., provision new virtual hardware, install automation agent on new hardware, download and execute current database software versions, mirror data from an existing node, transition configurations to utilize new Other validation functions can include, for example:

```
eval.auth( )
    if eval.auth.state = pass   // tests permissions, r/w to data &/or data config files
        ...
        generate.path( )
        ...
    else if eval.auth.state = fail
        report error
``` database instance, etc.), and post-conditions to validate that the operations were executed correctly.

In other architectures, for example, locally hosted databases the predefined database states encompass physical and/or local architectures. In one example, generation of the execution plan includes generation of configuration settings for each automation, modifying config servers of the distributed database with the automation agent information, and generating appropriate permissions for the automation agents.

Figure 6:
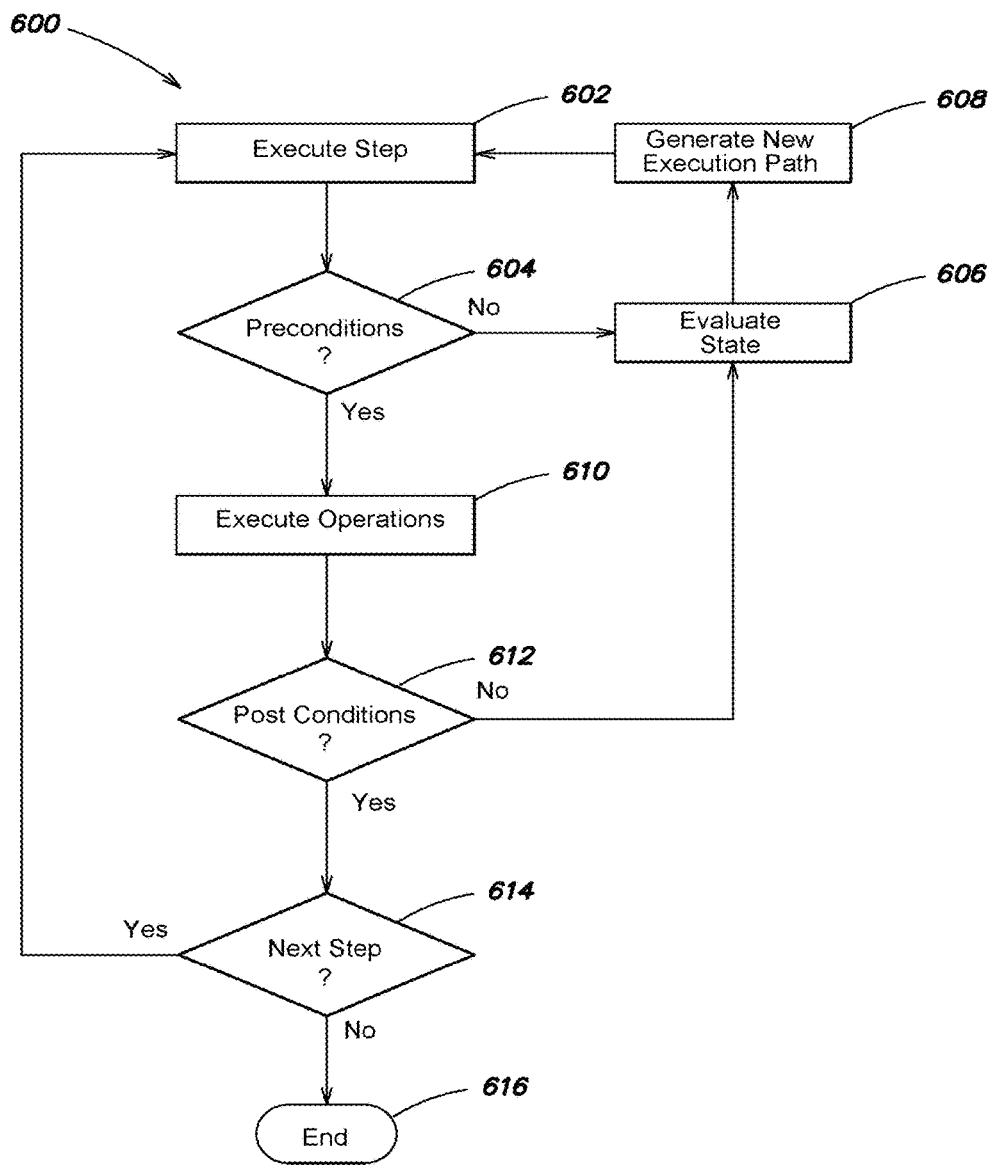
FIG. 6 is an example process flow for running steps in an execution plan, according to one embodiment.

FIG. 6 is an example process flow for running a generated execution plan. Process 600 begins at 602 with execution of a first step of an execution plan. Execution of any step in the execution plan can include testing pre-conditions defined for the step. For example, the preconditions can include testing to ensure that a database manager is running before upgrading the database software. Typically, the execution plan is developed based on current state, however, the precondition test can fail at 604 NO. The current state, for example, of a database node can be re-evaluated (e.g., at 606) and a new execution plan generated at 608 to account for any changes, failures, etc. Once pre-conditions are passed (e.g., 604YES), the operations defined for that state are executed at 610 and post-conditions are tested at 612 to validate whether the operation(s) were executed correctly (e.g., 612 YES—success). If the post conditions fail 612 NO, process 600 can continue with evaluation of the new current state at 606 and generation of a new execution plan at 608 to compensate for any errors.

In some embodiments, the pre-conditions can include specification that no other nodes are running operations from any automation process (e.g., the execution plan). For example, database nodes can post to common board that it is engaged in running the execution plan. The post operates similar to a process lock, notifying other nodes in the database not to begin the execution plan. Such posts can occur as part of step 610. In other embodiments, the automation agents can write status information to a local database. Each automation agent on other nodes can query such local databases to provided execution control, and enable phases or rolled execution.

According to one embodiment, once a step has been validated, any next step 614 YES, is executed in the same manner (e.g., 602-612) until no further steps are found 614 NO, and process 600 ends at 616.

Execution Plan Examples

In one embodiment, the distributed database maintains an operations log as discussed with respect to replica sets incorporated from application Ser. No. 14/064,705. Typically the operations log is implemented as capped collection or a fixed size database. As the operations log is critical for replication of data, the steps for modifying the operation log can be extensive and rigid.

Upgrade Cluster Execution Plan
    Check data set for compatibility for new software (e.g., execute db.upgradeCheckAllDBs( )—a command line function configured to validate each node for compatibility—in some examples db.upgradeCheckAllDBs( ) when executed checks each pre-condition, checks known states that cannot be upgraded, etc. and returns a pass fail parameter)
    If pass continue—start operation on single node, post to board active upgrade
    Upgrade authentication model for node
    Download new database binaries (e.g., upgrade to version 2.6)
    Disable the balancer for database (in some embodiments data balancer move heavily loaded data from one database node or instance to another to better distribute load—automation agents are configured to detect and disable data balancers to prevent data loss and/or corruption during upgrade).
    Upgrade the cluster's configuration meta data
    Wait for each database server process to exit on completion
    Upgrade each database server process, one at a time
    Upgrade each config server, one at a time, with the first one upgraded last
    Upgrade each shard (if sharded architecture), one at a time:
        Upgrade secondary nodes, one at a time
            Shut down the database manager
            Replace the database manager (e.g., 2.4) binary with the new version (e.g., 2.6 binary)
            Restart database manager
        Wait for member to recover to SECONDARY state
        Step down the primary node to secondary node role
        Wait for another member to be elected to PRIMARY
        Upgrade previous primary
    turn back on the balancer
    Resize Operation Log Execution Plan
    Shutdown a replica set member
    Start the member in standalone mode, listening on a different port than it usually does
    Back up the last oplog entry
    Drop the oplog
    Recreate the oplog with its new size
    Insert the saved oplog entry
    Stop the member
    Start the member with normal options
    Repeat Steps 1-8 for each of the remaining replica set members
    Automation of Security Integration (e.g., Kerberos, LDAP, SSL)
    Test automation agent can attach/authenticate to node
    Test permissions (e.g., super-user)
    Validate authentication certificate (e.g., SSL certificate)
    Test for data encryption
    For LDAP, automation agent test communication path to LDAP server
        Valid route to authentication server & valid authentication information
    Create user accounts in cluster for automation agents
        Create minimum viable management role for automation agents
    Repeat for each automation agent (e.g., on each node of the database)
    Execution Plan for Database Profiling
    Test for monitoring functions/existing automation agents
    Update tracked parameters
    Optional configuration settings for reporting to central management server
    Analyze performance data for database profiling
        Optionally recommend indexes for improving performance
        Optionally recommend partial indexes for improving performance
        Optionally recommend new storage engine for database
    Execution Plan for Encryption Key Rotation
    Most regulatory requirements mandate that a managed key used to decrypt sensitive data must be rotated out and replaced with a new key at least once annually. Automation systems can be configured to execute such rotation automatically.

Rolling Re-Encryption with Data Re-Encryption

Rolling re-encryption: (create new replica set nodes or resyncing existing replica set nodes in a rolling fashion (i.e., node by node) with new encryption keys).
 add a new member to a replica set (or shut down and delete all the data from an existing secondary)
 perform an initial sync (e.g., copy data to new node)
 new replica is then configured to use (or create) a new key for encryption
 "new key" method access or creates new key and re-encrypts all of the data on the new node with an entirely new set of database keys as well as a new master key
 once the new replica is fully synced, remove the old node from the replica set and delete all data on old node
 repeat this process on the remaining secondary nodes one at a time and
 step down the primary to secondary role—run the same procedure for stepped down primary
 validate all the members of the replica set using new master keys and new internal keys Automation can manage the process of internal and master key rotation achieving the goal of a full cluster key rotation with zero downtime.

Alternative Key Rotation Execution Plan

Another embodiment implements key rotations in a distributed database in conjunction with a KMIP server for key management. The approach implements a rolling upgrade (e.g., node by node upgrade) in order to rotate out the master key with zero downtime.

This embodiment provides a less intensive rotation as only the master key is rotated. The internal keystore will be re-encrypted, but the database keys will be otherwise left as they are with no need to re-encrypt the entire data set (e.g., an initial sync is not required).

According to one implementation, encryption regulations generally state that externally managed keys must be rotated because they are exposed to the risk of being compromised. The master key is the only externally managed key and is only used to encrypt the internal database keystore, which is never exposed to anyone.
 Start—restart a secondary with a newly generated master key (e.g., with KMIP server generate a new secondary and call "kmipRotateMasterKey.")
 Optionally allow user specified key
 New key rotated in and use to re-encrypt the internal database keystore with the new key.
 Shutdown server
 restart the server normally (e.g., removed the kmipRotateMasterKey parameter—the database instance will startup normally) using the new master key
 repeat steps for each secondary, one at a time
 step down the primary (e.g., assign primary a secondary role) and rotate stepped down primary's key as well
 test state—members of the replica set should be using new master keys for encrypting and decrypting the internal database keystore
 Execution concludes with the goal of a full cluster key rotation with zero downtime and no need to re-encrypt all of the data.

Execution Plan for Index Build
 stop first secondary in a replica set
  post condition test secondary state <offline> or <unavailable>
 stop the database manger process on the secondary
  post condition test database instance: <offline> or <unavailable>
 restart with the manager listening on a different port than normal configuration—renders the instance into "standalone" mode (post condition—test in "standalone" mode of operation)
  if manager normally runs with on the default port of 27017 with the new listening port the manager will not receive replication operations normally
   post condition: validate listening port different than starting configuration
  By running manager on a different port, ensuring that the other members of the replica set and all clients will not contact the member index is being built
 Build the Index (e.g., create the new index using the createIndex( ) as a shell command—operation will create or rebuild the index on the database instance)
  Post condition—test valid build of index (e.g., no returned errors, etc.)
 restart the database manager with listening port re-assigned normally
  validate dbmanager up and running—test state <online> (e.g., make sure up and running and listening on proper port—for example ping dbmanager to test
 normal replication will bring secondary up to date
 repeat above to build indexes on all secondary one at a time
 step down primary node (e.g., reassign primary role to secondary role)
 repeat above to build index on stepped down primary According to various embodiments, the preconditions are used by the system, and broadly stated, require at least that every distinct server/node that is meant to be part of the goal cluster configuration has to have a management agent on it. Other pre-conditions can test whether a database instance is up and running, whether a valid primary node is running, valid secondary nodes are running, etc. Broadly stated, post conditions include testing each node to determine if the prior execution resulting in the expected state for the node. As each node reports (e.g., copies current status to a local database queriable by other automation agents) a cluster-wide fingerprint is developed that validates successfully achievement of a next state or a goal state desired for the processes allocated to servers that match their own local server's hostname. In some examples, each automation agent (which by virtual of there being one for every server in the cluster as a precondition) validates that its local server looks precisely as it should for the full cluster configuration to be in the goal state, this is when the post-condition is met.

According to another embodiment, an execution plan can specify restoration of a back up data. The execution plan can cover multiple restoration scenarios. In one example, the execution plan includes instantiation of a mirrored architecture (e.g., a 4 node cluster is mirrored with 4 new database instances on 4 servers (although without data). The mirrored cluster is created with automation agents that can capture any specified back up data from the original cluster. Once the backup data is specified to the automation agents on the mirrored cluster, the backup data restored, and the execution plan can transition data operations to the mirrored cluster with the backup data. The original cluster can be taken offline, decommissioned, etc. (depending on defined goal state). In another example, the automation agents can operate on an original cluster to replace current data with backup data directly.

Further examples of execution plans include "whitelist backup" where automation-driven backup restores can be used to restore backups stored in either MongoDB's backup blockstore, or backups stored on a filesystem. The execution plan for a whitelist restores specifies that the system restores only whitelist collections, and the resulting data configuration will eliminate any collections that were not whitelisted.

Figure 7:
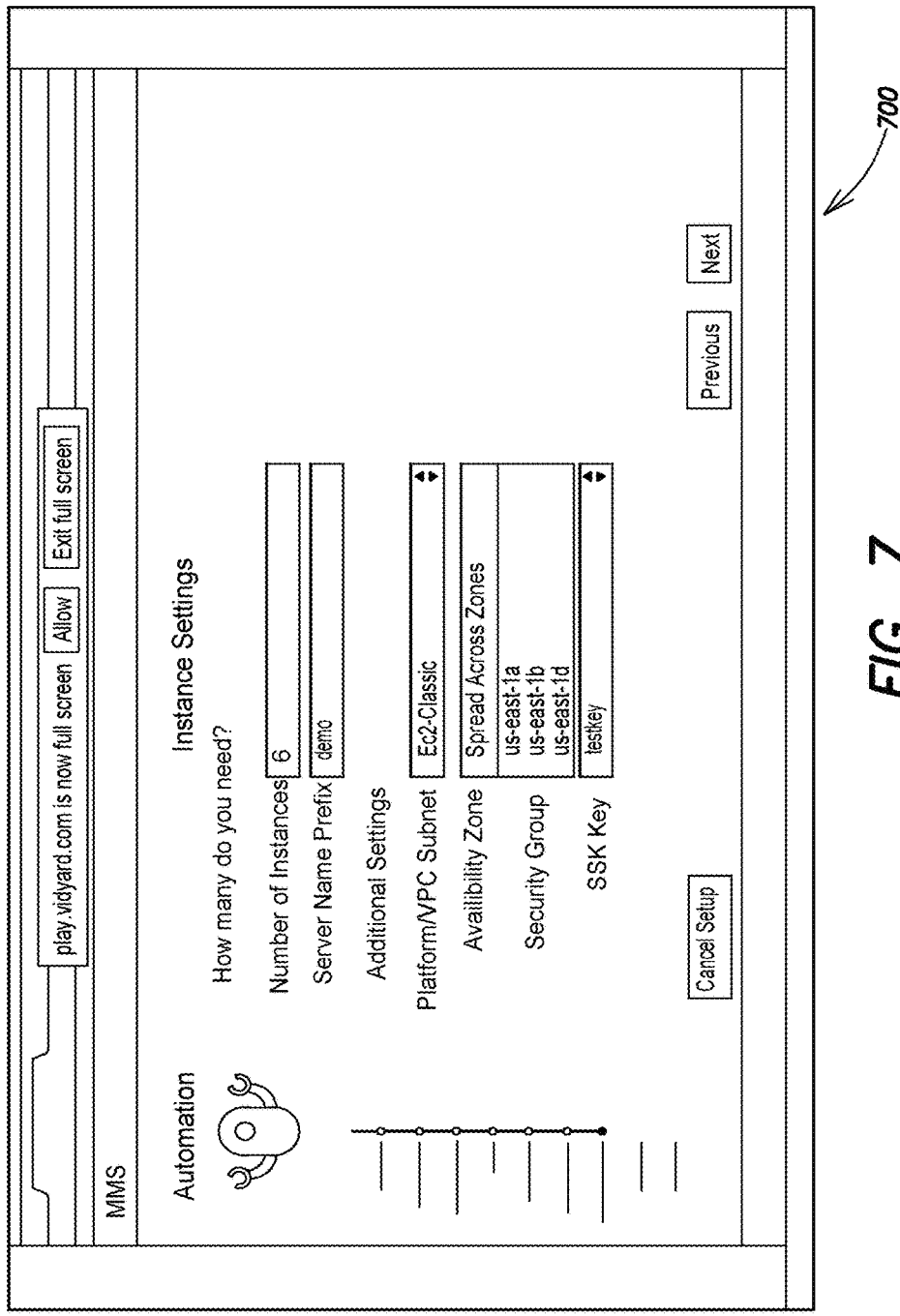
FIGS. 7-9 are screen captures of graphical user interfaces, according to one embodiment.
Figure 8:
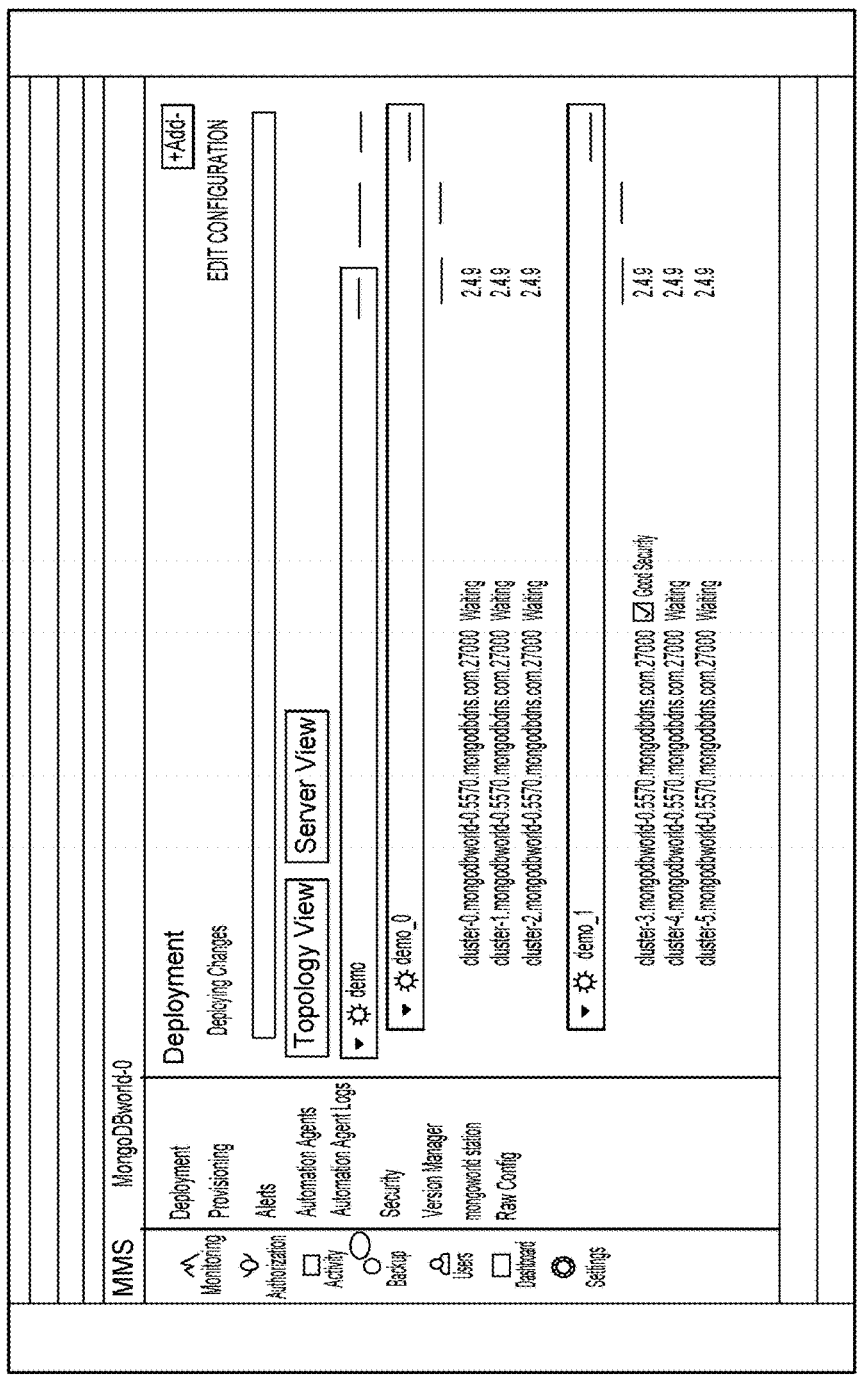
Figure 9:
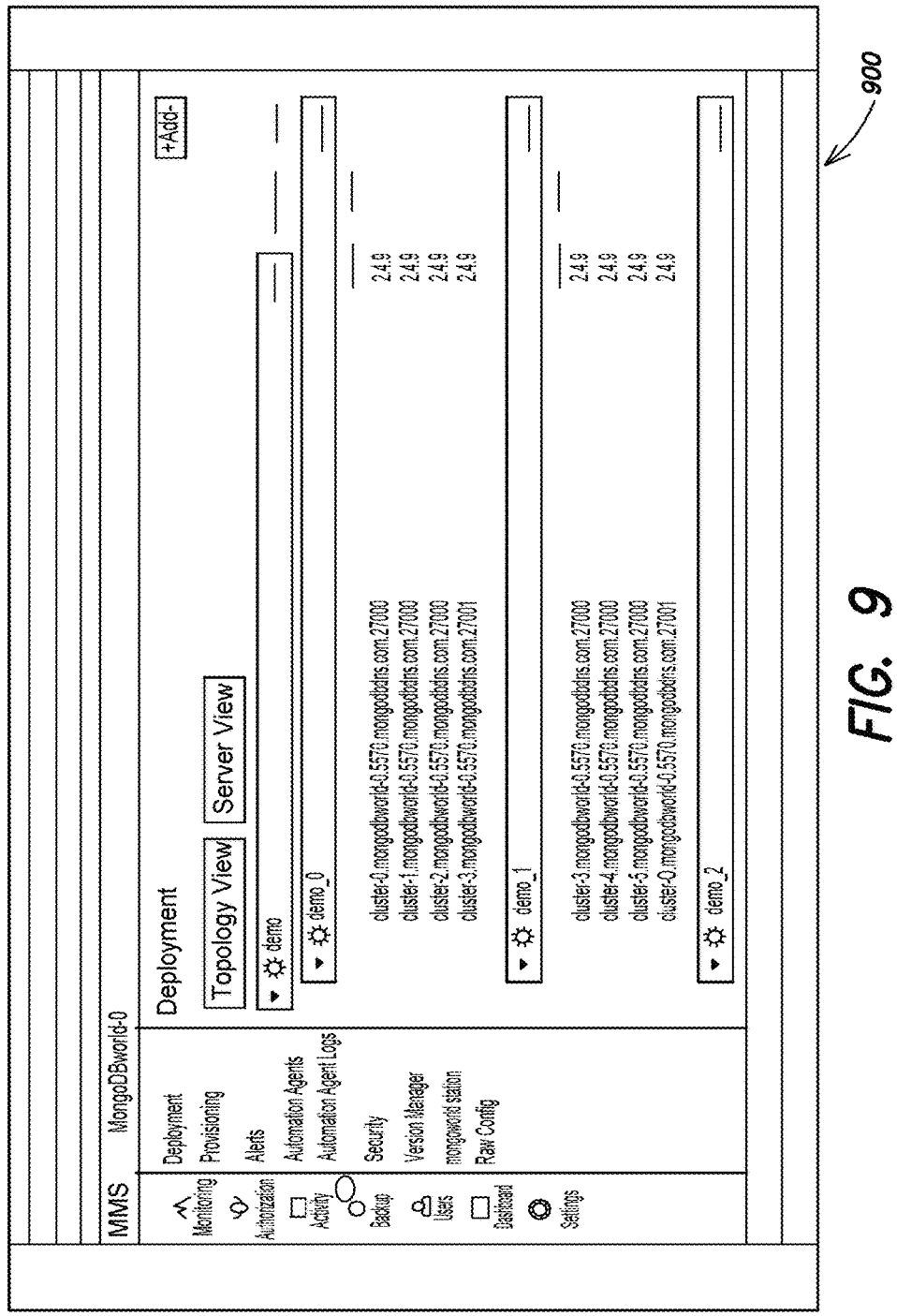

FIGS. 7-9 show example user interfaces that can be displayed to end users by an automation system. The user interfaces shown (e.g., 700, 800, and 900) are configured to provide information on current system state and/or accept user input to define goal states. The various interfaces can also be configured to report on potential automation tasks. For example, based on analysis of database performance, the automation system can determined that an new storage engine could improve performance. The automation system can request that the user approve creation of a new secondary node with the new storage engine and/or storage format. The new secondary can be monitored over time to validate an improved performance before rolling out the change in storage engine and/or format to the remaining nodes in, for example, a replica set. The automation system can also generate an execution plan for rolling updates to the replica set nodes to the new storage engine and/or format, responsive to validating performance improvement.

The various functions, processes, and/or pseudo code described herein can be configured to be executed on the systems shown by way of example in FIGS. 1, 3, and/or 4. The systems and/or system components shown can be specially configured to execute the processes and/or functions described. Various aspects and functions described herein, in accord with aspects of the present invention, may be implemented as specially configured hardware, software, or a combination of hardware and software on one or more specially configured computer systems. Additionally, aspects in accord with the present invention may be located on a single specially configured computer system or may be distributed among one or more specially configured computer systems connected to one or more communication networks.

For example, various aspects, components, and functions (e.g., shard, node, data router, database manager, automation engine, automation system, automation agent, state component, planning component, UI component, etc.) may be distributed among one or more special purpose computer systems configured to provide a service to one or more client computers, mobile device, or to perform an overall task as part of a distributed system. Additionally, aspects may be performed on a client-server or multi-tier system that includes components or engines distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 10:
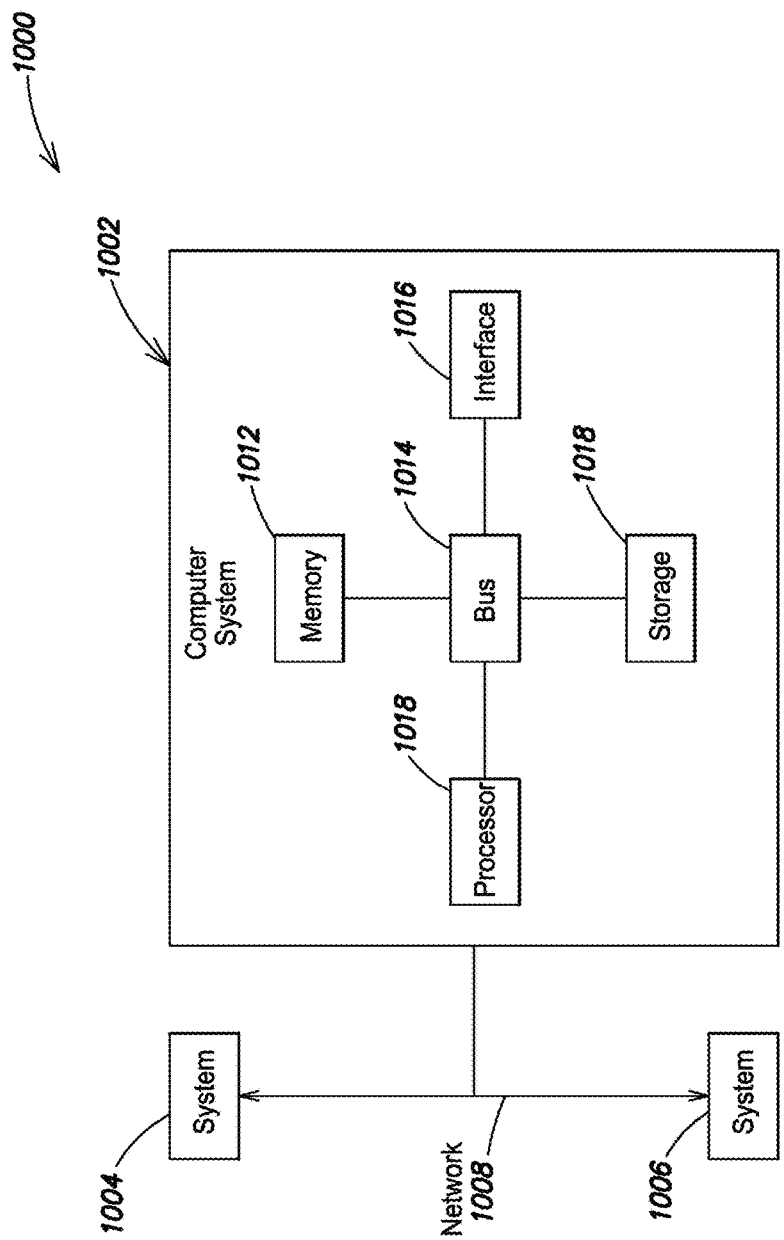
FIG. 10 is a block diagram of a special purpose computer system, according to one embodiment.

Referring to FIG. 10, there is illustrated a block diagram of a distributed special purpose computer system 1000, in which various aspects and functions are practiced (e.g., including a replication component (e.g., captures executed write operations and distributes to nodes hosting the same copy of data), a configuration component (e.g., enables arbiter participation in either or both data commitment and primary election), an election component (e.g., triggers election protocols in response to primary failure), among other options). As shown, the distributed computer system 1000 includes one more special purpose computer systems that exchange information. More specifically, the distributed computer system 1000 includes computer systems 1002, 1004 and 1006. As shown, the computer systems 1002, 1004 and 1006 are interconnected by, and may exchange data through, a communication network 1008. For example, a segment of a distributed database can be implemented on 1002, which can communicate with other systems (e.g., 1004 and 1006), which host other or remaining portions of the database data, and or copies of the database data.

In some embodiments, the network 1008 may include any communication network through which computer systems may exchange data. To exchange data using the network 1008, the computer systems 1002, 1004 and 1006 and the network 1008 may use various methods, protocols and standards, including, among others, TCP/IP, or other communication standard, and may include secure communication protocols VPN, IPsec, etc. To ensure data transfer is secure, the computer systems 1002, 1004 and 1006 may transmit data via the network 1008 using a variety of security measures including, for example, TLS, SSL or VPN or other standard. While the distributed computer system 1000 illustrates three networked computer systems, the distributed computer system 1000 is not so limited and may include any number of computer systems and computing devices, networked using any medium and communication protocol.

As illustrated in FIG. 10, the special purpose computer system 1002 includes a processor 1010, a memory 1012, a bus 1014, an interface 1016 and data storage 1018 and further includes any one or more of the component discussed above to implement at least some of the aspects, functions and processes disclosed herein, as either a stand-alone system or part of a distributed system. In some embodiments, the processor 1010 performs a series of instructions that result in manipulated data. The processor 1010 may be any type of processor, multiprocessor or controller. The processor 1010 is connected to other system components, including one or more memory devices 1012, by the bus 1014.

The memory 1012 stores programs and data during operation of the computer system 1002. Thus, the memory 1012 may be a relatively high performance, volatile, random access memory such as a dynamic random access memory (DRAM) or static memory (SRAM) or other standard. However, the memory 1012 may include any device for storing data, such as a disk drive, hard drive, or other non-volatile storage device. Various examples may organize the memory 1012 into particularized and, in some cases, unique structures to perform the functions disclosed herein. These data structures may be sized and organized to store values for particular to specific database architectures and specific data types, and in particular, may include standardize formats for organizing and managing data storage.

Components of the computer system 1002 are coupled by an interconnection element such as the bus 1014. The bus 1014 may include one or more physical busses, for example, busses between components that are integrated within the same machine, but may include any communication coupling between system elements including specialized or standard computing bus technologies such as IDE, SCSI, PCI and InfiniBand or other standard. The bus 1014 enables communications, such as data and instructions, to be exchanged between system components of the computer system 1002.

The computer system 1002 also includes one or more interface devices 1016 such as input devices, output devices and combination input/output devices. Interface devices may receive input or provide output. More particularly, output devices may render information for external presentation. Input devices may accept information from external sources. Examples of interface devices include keyboards, mouse devices, microphones, touch screens, printing devices, display screens, speakers, network interface cards, etc. Interface devices allow the computer system 1002 to exchange information and to communicate with external entities, such as users, vendors, and other systems.

The data storage 1018 includes a computer readable and writeable nonvolatile, or non-transitory, data storage medium in which instructions are stored that define a program or other object that is executed by the processor 1010. The data storage 1018 also may include information that is recorded, on or in, the medium, and that is processed by the processor 1010 during execution of the program. More specifically, the information may be stored in one or more data structures specifically configured to conserve storage space or increase data exchange performance.

The instructions stored in the data storage may be persistently stored as encoded signals, and the instructions may cause the processor 1010 to perform any of the functions described herein. The medium may be, for example, optical disk, magnetic disk or flash memory, among other options. In operation, the processor 1010 or some other controller causes data to be read from the nonvolatile recording medium into another memory, such as the memory 1012, that allows for faster access to the information by the processor 1010 than does the storage medium included in the data storage 1018. The memory may be located in the data storage 1018 or in the memory 1012, however, the processor 1010 manipulates the data within the memory, and then copies the data to the storage medium associated with the data storage 1018 after processing is completed. A variety of components may manage data movement between the storage medium and other memory elements and examples are not limited to particular data management components. Further, examples are not limited to a particular memory system or data storage system.

Although the computer system 1002 is shown by way of example as one type of computer system upon which various aspects and functions may be practiced, aspects and functions are not limited to being implemented on the computer system 1002 as shown in FIG. 10. Various aspects and functions may be practiced on one or more specially configured computers having different architectures or components than that shown in FIG. 10 which can be modified to include the specially purpose components and/or functions discussed. For instance, the computer system 1002 may include specially programmed, special-purpose hardware, such as an application-specific integrated circuit (ASIC) tailored to perform any one or more operations disclosed herein (e.g., validating received operations, routing write operations, replicating operations, among other examples). While another example may perform the same function(s) using a grid of several computing devices running MAC OS System X with Motorola PowerPC processors and several specialized computing devices running proprietary hardware and operating systems.

The computer system 1002 may be a computer system including an operating system that manages at least a portion of the hardware elements included in the computer system 1002. Additionally, various aspects and functions may be implemented in a non-programmed environment, for example, documents created in HTML, XML or other format that, when viewed in a window of a browser program, can render aspects of a graphical-user interface or perform other functions.

According to one embodiment, a distributed database can include one or more data routers for managing distributed databases. The one or more data routers can receive client request (e.g., user entered data requests, data requests received from an application programming interface (API), or other computing entity requests) and route request to appropriate servers, systems, or nodes within the distributed database. In some embodiments, database nodes can include automation agents configured to run execution plans to adjust the configurations of the respective database node, and/or the entire database.

Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g., specialized hardware, executable code, data structures or data objects, that are configured to perform the functions described herein.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A system for automatically integrating cloud based resources into a distributed database executing on local hardware, the system comprising:
   at least one hardware based processor operatively connected to a memory;
   a state component, executed by the at least one hardware based processor, configured to determine a current state for a plurality of database nodes, wherein the current state determination identifies a database instance executing on client hardware including at least one replica set having a primary node hosting a primary database instance that accepts database write operations from client systems, and at least two secondary nodes that host copies of the primary database instance that replicate logged write operations from the primary node, a database version executing on the replica set, and configuration data for at least one database instance;

a planning component, executed by the at least one hardware based processor, configured to generate an execution plan to provision an additional secondary node mirroring the primary node and the primary database; and an automation component, executed by the at least one hardware based processor, configured to:
provision at least one cloud resource having processor and memory based on the execution plan;
install database binary files including automation agents for a secondary node on the at least one cloud resource;
trigger synchronization between the primary node and the secondary node executing on the at least one cloud resource;
update configuration metadata for the database instance; and
replicate write operations on the primary node executing on client hardware received after synchronization to the secondary node executing on the at least one cloud resource.

2. The system of claim 1, wherein the secondary node executing on the at least one cloud resource is configured to query an operation log on the primary node executing on the client hardware.

3. The system of claim 2, wherein the secondary node captures new operations from the primary's operation log, and replicates the operations on its copy of the database data.

4. The system of claim 1, wherein the system is configured to:
update the configuration metadata for the database instance; and
direct secondary read requests to any secondary nodes in the replica set include the secondary node executing on the at least one cloud resource.

5. The system of claim 1, wherein the system is configured to trigger provisioning of the secondary node on the least one cloud resource responsive to a user interface command to mirror the database.

6. The system of claim 1, wherein the system is configured to move processing from the original nodes over to the newly instantiated nodes.

7. The system of claim 6, wherein the secondary node executing on the at least one cloud resource assumes a primary role for the replica set.

8. The system of claim 7, wherein the system is configured to monitor database performance with the primary node executing on the at least one cloud resource.

9. The system of claim 8, wherein the planning component is configured to generate an execution plan to return database processing to a primary node executing on the client hardware.

10. The system of claim 9, wherein the system is configured to generate a user interface tool, and the user interface tool is configured to trigger the automation agent to execute the execution plan to return the database processing to the primary node executing on the client hardware responsive to user selection.

11. The system of claim 1, wherein the planning component is configured to generate an execution plan with a goal state including a plurality of cloud resources hosting mirrored nodes for each node in the replica set executing on the client hardware.

12. The system of claim 1, wherein the at least one replica is configured to manage a dynamic schema database instance.

13. A computer implemented method for automatically integrating cloud based resources into a distributed database executing on local hardware, the method comprising:
determining, by at least one processor, a current state for a plurality of database nodes, wherein determining the current state includes identifying a database instance executing on client hardware including at least one replica set having a primary node hosting a primary database instance that accepts database write operations from client systems, and at least two secondary nodes that host copies of the primary database instance that replicate logged write operations from the primary node, a database version executing on the replica set, and configuration data for at least one database instance;
generating, by the at least one processor, an execution plan to provision an additional secondary node mirroring the primary node and the primary database;
provisioning, by the at least one processor, at least one cloud resource having processor and memory based on the execution plan;
installing, by the at least one processor, database binary files including automation agents for a secondary node on the at least one cloud resource;
triggering, by the at least one processor, synchronization between the primary node and the secondary node executing on the at least one cloud resource;
updating, by the at least one processor, configuration metadata for the database instance; and
replicating, by the at least one processor, any write operations receive on the primary node executing on client hardware after synchronization to the secondary node executing on the at least one cloud resource.

14. The method of claim 13, wherein replicating includes querying, by the secondary node executing on the at least one cloud resource, an operation log on the primary node executing on the client hardware.

15. The method of claim 14, further comprising capturing new operations from the primary's operation log, and replicating the new operations on the secondary node's copy of the database data.

16. The method of claim 13, wherein the act of provisioning is executed responsive to receiving a user interface command to mirror the database.

17. The method of claim 13, further comprising an act of moving processing from the original nodes over to the newly instantiated node.

18. The method of claim 13, further comprising monitoring database performance with the primary node executing on the at least one cloud resource.

19. The method of claim 13, further comprising generating an execution plan with a goal state including a plurality of cloud resources hosting mirrored nodes for each node in the replica set executing on the client hardware.

20. The method of claim 13, further comprising generating a user interface tool, wherein the user interface tool is configured to trigger an automation agent to execute an execution plan to return the database processing to the client hardware responsive to user selection.

* * * * *